United States Patent [19]

Liebel

[11] 4,432,678
[45] Feb. 21, 1984

[54] LOAD RETAINER

[75] Inventor: Henry L. Liebel, Cincinnati, Ohio
[73] Assignee: Angleboard Inc., Cincinnati, Ohio
[21] Appl. No.: 318,843
[22] Filed: Nov. 6, 1981
[51] Int. Cl.³ ............................ B60P 7/08; B60P 7/16; B61D 45/00
[52] U.S. Cl. ...................................... 410/151; 410/143
[58] Field of Search ................ 410/143, 145, 151, 152

[56] References Cited

U.S. PATENT DOCUMENTS

| 969,002 | 8/1910 | Teachout | 410/151 |
| 2,414,160 | 1/1947 | Moon | 410/151 |
| 2,766,704 | 10/1956 | McMahon | 410/151 |
| 2,912,939 | 11/1956 | Miner, Jr. et al. | 410/145 |

*Primary Examiner*—Robert B. Reeves
*Assistant Examiner*—Howard Beltran
*Attorney, Agent, or Firm*—Wood, Herron & Evans

[57] ABSTRACT

A load retainer assembly for bracing loads in a load containing vehicle including a pair of shoes each adapted to receive the ends of a wooden bracing member, e.g., a wooden two-by-four, a pair of end plates, one end plate being attached directly to one of the shoes, and a screw adjustably connecting the other end plate to the other shoe. When the ends of the wooden bracing member are placed in the shoes, movement of the screw extends the overall distance between the end plates whereby the load retainer may be mounted in the load container vehicle with the wooden bracing member extending between the opposed side walls of the vehicle and across the load and being held firmly in place by the engagement of the end plates with the opposed side walls of the vehicle. The load retainer may be removed from its bracing position in the vehicle by adjustment of the screw to decrease the distance between the end plates to remove the compressive force on the bracing member and in turn the force on the end plates holding them against the vehicle side walls.

4 Claims, 4 Drawing Figures

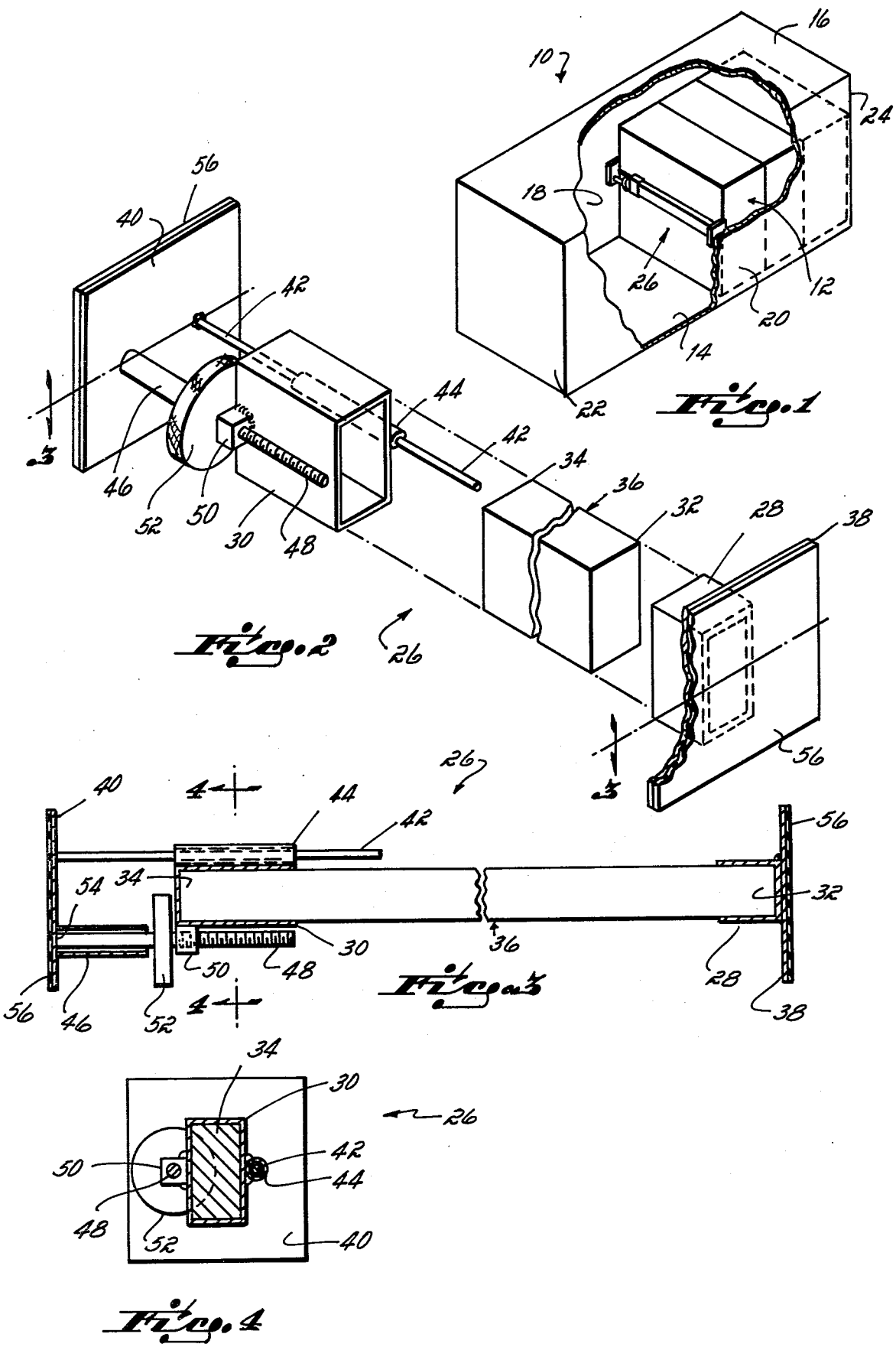

LOAD RETAINER

BACKGROUND OF THE INVENTION

This invention relates to a load retainer for bracing loads in a load containing vehicle.

In the shipment of merchandise, for example, by trucks or by rail, it is often necessary to brace the load in the vehicle to keep the load stacked and to keep it from shifting while the vehicle is in motion which might otherwise cause damage to the goods. Accordingly, when merchandise is shipped which does not fill the entire container, it is common to employ means to hold the merchandise in position to prevent its shifting during travel. Even when the load fills the entire vehicle such means are often used to prevent the load from being stacked against the rear door of the vehicle.

One such means are inflatable air bags which are inserted in position between loads or between the load and the end wall of the vehicle and then inflated with air, the air-filled bag thereby bracing the load in position. Although air bags are relatively inexpensive, their use has a number of disadvantages including the fact that they require a source of compressed air for inflation, are subject to tearing, cannot be reused, and take a relatively long time to install.

Another device known to the art is a brace which extends between the opposed side walls of the vehicle and across the load thereby holding it in place. Such bracing should be strong, light and easy to use such that it can be mounted into position easily by a single operator. Additionally, the bracing should be self-contained such that it may be easily mounted in position across the load and removed without the need for any construction built into the walls of the vehicle for mounting the bracing.

Although such load retaining bracing is known to the art, the primary drawback of such prior art devices has been their expense. That is, prior art load retainers or cargo control bars as they are sometimes called have been made entirely of metal such as steel or aluminum. These units are typically 86 inches in length with provision for extending the length up to 12 inches such that they can be mounted to span a 92 inch wide trailer. With metal bars of this length and provision for adjusting and locking the bar in place, the cost of the device becomes quite high. This is disadvantageous not only in that the initial purchase is an expensive one but also such load retainers after shipping are often lost or misplaced requiring additional bars to be purchased. Moreover, prior art devices do not provide any means for breaking down the length of the bars so that when they are shipped back to the point of origin, they are cumbersome to ship and take up space.

BRIEF DESCRIPTION OF THE INVENTION

It has been an objective of this invention to provide an improved load retainer assembly which overcomes the problems of prior art devices discussed above and, particularly, one which substantially lowers the cost of such devices by anywhere from three to seven-fold.

To this end, the load retainer assembly of the present invention includes a pair of shoes each adapted to receive the end of a wooden bracing member such as an inexpensive two-by-four inch board which may be conveniently purchased in a wide variety of locations. The load retainer further includes a pair of end plates, one of the end plates being attached to one of the shoes and the other being connected to the other shoe by an adjustment screw such that adjustment of the screw extends the distance between the end plates and the shoe a desired amount. Thus, when the ends of the wooden brace are mounted in the shoes, movement of the screw adjusts the overall length of the load retainer, i.e., the distance between end plates such that they may be extended to firmly hold the retainer between the opposed side walls of the load containing vehicle. The bracing member, which is placed in compression, extends across the load between the side walls thereby holding the load in place. Resilient pads may be adhered to the wall-facing side of the end plates to prevent slipping of the end plates on the walls of the vehicle. When it is desired to remove the load retainer, the screw is simply adjusted to release the compressive load on the bracing member whereby the load retainer may then be easily removed from the vehicle. After removal, the bracing member can be taken out of the shoes and discarded if desired. This breaks down the load retainer to a size whereby the shoes with attached end pads may be grouped together and conveniently shipped.

Among the many advantages of the present invention are that it can be manufactured relatively inexpensively and sold at one-third or even less than cargo bars now commercially available. An 86 inch long by two-by-four inch wide board is a relatively inexpensive article, and it may be conveniently obtained at a number of locations. Thus, even if the load retainer is lost or misplaced, the dollar value of the loss is relatively small. In returning the retainer to its point of origin, the two-by-four can be discarded and only the hardware shipped back in a convenient and compact form. Moreover, the load retainer of the present invention may be mounted and demounted in the vehicle by a single operator, and the wooden brace may be nailed into to provide additional bracing, for example, bracing extending in other directions, if desired.

BRIEF DESCRIPTION OF THE DRAWINGS

FIG. 1 is a perspective view of a load container with parts of the walls and ceiling broken away to illustrate the environment in which the present invention is intended to be used.

FIG. 2 is an exploded perspective view of the load retainer of the present invention.

FIG. 3 is a cross-section of the load retainer taken on line 3—3 of FIG. 2.

FIG. 4 is a view taken along line 4—4 of FIG. 3.

DETAILED DESCRIPTION OF THE INVENTION

Referring first to FIG. 1, there is shown a load containing vehicle 10 in which merchandise 12 is stacked for shipment. The container includes bottom and top walls, 14 and 16, respectively, a pair of side walls 18 and 20, and a pair of end walls 22 and 24. As shown in FIG. 1, the stacked merchandise or load 12 does not fill the entire interior of vehicle 10 and the load retainer 26 of the present invention is used to hold the load 12 in position and prevent its shifting during movement of the vehicle 10. As explained in detail below, the load retainer is insertable and removable in position in the vehicle 10 between the side walls 18 and 20 with the retainer 26 extending across the load 12 and with the compressive load on the retainer 26 locking it in position in the vehicle 10.

Referring in addition to FIG. 2, the load retainer assembly 26 comprises a pair of shoes 28 and 30 having a rectangular cross-section for receiving the ends 32 and 34 of a wooden bracing member 36. In one presently preferred embodiment of the invention, the shoes are sized to receive the ends of a common wooden two-by-four and thus have dimensions of about 1⅝ inch by 3⅝ inch which is the typical dressed dimension of a wooden two-by-four. One of the advantages of the present invention is the fact that wooden two-by-fours are relatively inexpensive to obtain, and an operator may purchase a two-by-four of any desired length inexpensively and at any number of convenient locations.

Attached to the closed end of one shoe 28 is a rectangular end plate 38. A like end plate 40 is provided and has attached to it a guide rod 42 which slides in a tubular guide 44 attached to one outside wall of the shoe 30. A tubular member 46 is attached at one end to the end plate 40 and loosely receives and supports at one end a screw 48. The screw 48 is threaded into a nut 50 which is attached to the opposite outside wall of the shoe 30, for example, by welding. A knurled wheel 52 is fixed to the screw 48 between the nut 50 and the tube 46. Rotation of the wheel 52 rotates the screw 48 in the nut 50 and the screw turns freely in the tube 46. The forward end 54 of the screw 48 bears against the end plate 40 such that rotation of the wheel 52 rotates the screw 48 in the nut 50 causing the screw to move forwardly in the nut in turn causing the end plate 40 to be moved away from the closed end of the shoe 30. Movement of the wheel 52 in the opposite direction moves the screw 48 back in the nut 50 thereby relieving the force of the forward end 54 of the screw 48 on the end plate 40. The tubular guide 44 which receives the rod 42 serves to maintain the position of the end plate 40 with respect to the shoe 30, e.g., preventing rotation of the plate 40 on rotation of the wheel 52 and screw 48.

Accordingly, when the ends 32 and 34 of the wooden bracing member 36 are placed in the shoes 28 and 30, the wheel 52 may be rotated to move the screw 48 thus increasing the overall distance between the end plates 38 and 40. Resilient padding 56 such as a rubber cushion material may be placed on the wall-facing sides of the end plates 38, 40 to provide a non-slip surface for engaging the side walls 18 and 20 (FIG. 1) of the container. When the load retainer 26 is placed in position in a vehicle, it is held by the operator in one hand and the length is such that the end plates 38 and 40 normally lightly engage the walls 18 and 20 of the container 10. With his other hand, the operator turns the wheel 52 thereby advancing the screw 48 in the nut 50. This extends the end plate 40 away from the shoe 30 and thereby placing a compressive load on the wooden brace 36. Continued movement of the wheel 52 and screw 48 continues to increase this force until the retainer 26 is securely locked between the side walls 18 and 20 of the vehicle 10. The diameter of the wheel is intentionally kept small, for example, on the order of 3 inches to limit the mechanical advantage that the operator has to prevent his putting excessive pressure on the vehicle side walls.

As stated above, the shoes 28 and 30 are sized to receive the ends of a typical 2 inch by 4 inch wooden member. The screw typically has a 6 inch travel. Accordingly, in a typical container which is 92 inches wide, the user will provide an 86 inch two-by-four. In larger vehicles such as boxcars which have a width spanning 110 inches, it may be desired to use a larger shoe such that it will hold two two-by-fours to span a wider distance without flexing.

To remove the load retainer 26, it is merely necessary to turn the wheel 52 in the opposite direction to move the screw 48 back in the nut 50 to relieve the compressive force on the two-by-four brace 36. When this is done, the end plate 40 may be slid toward the shoe 30 thereby decreasing the overall length of the load retainer and permitting its removal from its position securing the load 12 in place.

The load retainer of the present invention is thus of a simple but yet an efficient construction allowing it to be manufactured from a minimum of parts and relatively inexpensively. The provision for the insertable and removable wooden bracing member 36 eliminates the need for a long and expensive permanent member in this position and further permits the brace to be discarded after use whereby the shoes and end plates may be grouped and conveniently shipped back to their point of origin. Moreover, even if the retainer is not returned, the loss is minimized because the retainer being simple in construction may be purchased relatively inexpensively as well as the removable wooden brace. Moreover, the wooden brace can be nailed into whereby additional bracing, for example, in a vertical direction may be added.

Although the invention has been described in terms of a certain preferred embodiment, it will be recognized that other forms may be adapted within the skill of the art. Moreover, although the invention has been described in terms of its use between the side walls of a vehicle, it will be recognized that it is equally applicable in a position extending from front to back or top to bottom.

I claim:

1. A load retainer assembly for bracing a load in a load containing vehicle comprising:

a pair of shoes having side walls defining a pair of receptacles, each adapted to removably receive ends of a wooden bracing member, a pair of end plates, one end plate being attached to one of said shoes, and advancing and retracting means connected to the side walls of the other of said shoes outside of said receptacle and connecting the other of said shoes and the other of said end plates for adjusting the distance therebetween such that when the wooden bracing member is received in said shoes the overall distance between the said end plates may be adjusted to hold said end plates against the opposed walls of said vehicles with said bracing member extending therebetween and across said load to retain said load in said vehicle.

2. The load retainer assembly of claim 1 wherein said advancing and retracting means comprises a screw supported on said other of said end plates, a nut attached to the outside of a side wall of said other of said shoes, said screw being received in said nut, and means for turning said screw in said nut.

3. The load retainer assembly of claim 2 wherein said means for turning said screw comprises a wheel fixed to said screw.

4. The load retainer assembly of claim 2 wherein said advancing and retracting means further comprises a guide rod attached to said other of said end plates and a tubular guide attached to the outside of a side wall of said other of said shoes and receiving said guide rod for cooperatively supporting said other of said end plates on said other of said shoes.

* * * * *